Jan. 3, 1950 — A. KÄSER — 2,493,456
IMMERSION TEMPERATURE REGULATOR WITH THERMAL RESET
Filed Sept. 13, 1944
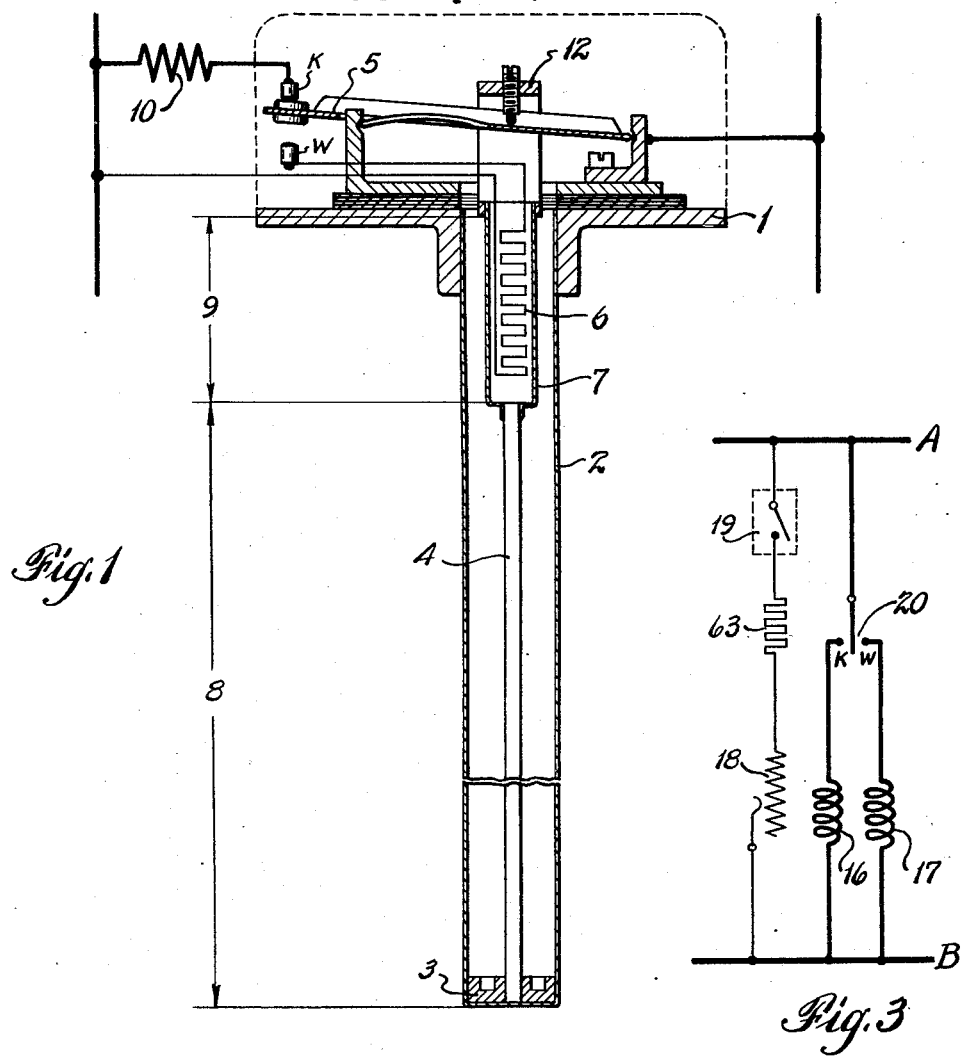
Fig. 1
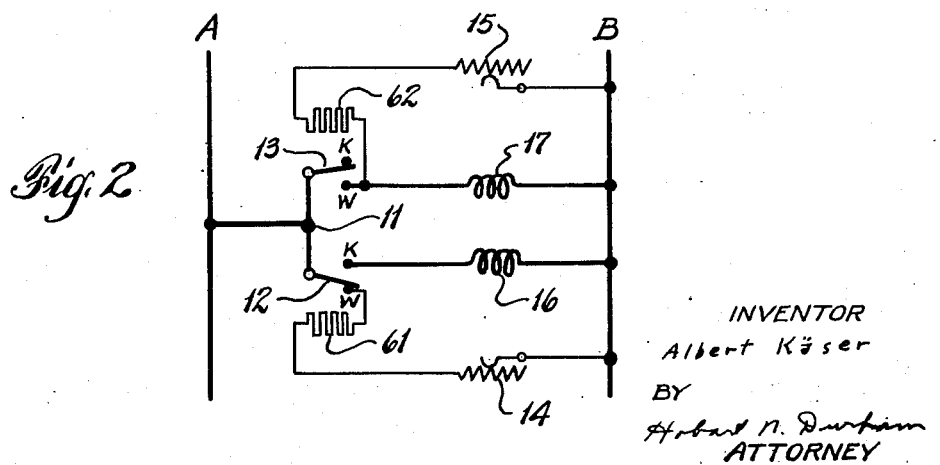
Fig. 2
Fig. 3
INVENTOR
Albert Käser
BY
Hobart N. Durham
ATTORNEY Patented Jan. 3, 1950

2,493,456

UNITED STATES PATENT OFFICE 2,493,456

IMMERSION TEMPERATURE REGULATOR WITH THERMAL RESET

Albert Käser, Zug, Switzerland, assignor to Landis & Gyr A. G., a corporation of Switzerland Application September 13, 1944, Serial No. 553,838
In Switzerland July 9, 1943

Section 1, Public Law 690, August 8, 1946
Patent expires July 9, 1963

5 Claims. (Cl. 200—122)

This invention relates to an immersion temperature regulator with thermal reset operated by an auxiliary electric force. Temperature feelers of the kind consist of a tubular feeler being sensitive to changes in temperature, i. e. a tubular feeler made of two metals with different coefficients of expansion. By the difference in the change of length of the two metals a switch comes into play with which the heating plant can be controlled. Such temperature regulators may be equipped with a maximum or with a maximum and a minimum contact. They are open to objection insofar as they require a comparatively great change of temperature for their operation. To overcome this, various proposals and designs have been offered in the form of thermal resets with additional electric heating arrangements, the heated reset member being outside the temperature feeler. However, such an arrangement has the drawback that it depends on the temperature of the surroundings of the return member.

It is a primary object of the present invention to diminish the dependence of an immersion temperature regulator on its surroundings to a considerable degree by having the thermal reset effected by means of an electric heating arrangement working on an expansion body of the feeler itself.

The invention will be further described with reference to the accompanying drawings, in which a preferred form of an immersion temperature regulator is illustrated by way of example, and where:

Fig. 1 is a sectional view of an immersion temperature regulator;

Fig. 2 shows a wiring diagram for an embodiment of the present invention; and

Fig. 3 shows a wiring diagram for a different embodiment of the invention.

According to Fig. 1 the temperature feeler represented contains an expansion tube 2 fastened at one end in a flange 1; to the free end 3 of said tube a base rod 4 is secured within it in the conventional manner. This base rod 4, however, does not act directly on the electric switch organ 5 fixed in flange 1 as with common temperature regulators of the kind, but on a tubular body 7 provided between these two, being fixedly connected with the base rod 4 and heatable by means of the heating member 6. The tubular body 7 has rigidly connected thereto at its upper portion a stirrup member 12 which embraces the switch organ 5. The tubular body 7 is of the same material as the expansion tube 2 and serves in conjunction with the heating member 6 as a thermal reset member. The arrangement of the reset member within the expansion tube offers the advantage that the arrangement is independent of the temperature surrounding the head of the apparatus. The purpose of the reset member is to stabilize the regulating process. Instability of the latter is due to the ever present retardation of the reaction of the regulated object. Its consequence is that every regulating order arrives too late by the amount of said time of retardation, causing therefore over regulation. The reset is to simulate a fictitious value which leads the real value exactly by the amount of the reaction retard, so that the regulator engages at the right time and prevents over regulation.

At the usual speeds of temperature changes to which the expansion tube 2 is subjected, the reset member 7 follows in the non-heated state, because of its small mass, the temperature of the extension tube 2, that is to say, of the temperature medium, so that the temperature of these two parts is practically the same. The expansions of the expansion tube 2 are therefore compensated by the reset member within the range of the longitudinal extension of the latter, so that the expansion tube 2 is to be regarded as active only for the length 8 of the basis rod 4, the length 9 remaining inactive.

When the temperature feeler is in the cold state the contact arm 5 of the switching member is on contact $k$ and closes the circuit containing the switch, for example an electric heating line 10 serving to heat the medium the temperature of which is to be regulated. On reaching the temperature desired the contact arm 5 switches momentarily to contact $w$ and thus interrupts the outer circuit 10. The contact arrangement described thus represents a tilting mechanism in which the contact arm 5 is in a stable equilibrium only in one of the two extreme positions.

As every electric switch has to go a specified switching path, its movement involves in all circumstances work which commonly must be undertaken by the temperature feeler. The switching function consequently presupposes a greater or smaller temperature difference on the temperature feeler and, it is termed the static switching difference $U_{stat}$. In the above case, therefore, the temperature feeler must cool off by this amount before the switch again tilts back and closes the external load circuit. The temperature variations of the medium being regulated resulting therefrom are then considerably reduced by the reset organ 7. When the contact arm 5 is thrown on contact w, the heating coil arranged in the reset organ 7 is connected up, whereby its tubular body undergoes an expansion in the sense of a rigid reset, i. e. in a direction opposed to that foregoing of the expansion tube. The position of the temperature feeler with regard to the switch organ is then such, as if the temperature feeler had been cooled off by a definite amount. According to the intensity of the heating action, the temperature change of the temperature feeler required to perform the switching function during the cooling process can be successfully reduced or eliminated altogether.

If the intensity of the heating action is more strongly proportioned than would be necessary for exercising the switching function, the temperature feeler in the state of inertia then becomes an automatic switch independent of temperature, that is to say an "on"-and-"off" regulator with impressed switching frequency. Such an instrument lends itself particularly well to difficult regulating duties without any increase of the regulating oscillations.

Upon changing over of the contact arm 5 to contact k the heating coil 6 is again cut out and the thermal action of the reset organ 7 dies away in proportion as the exchange of warmth with the expansion tube 2 takes place, and thus adapts its temperature to that of the expansion tube. The time required hereto for dying away depends on the time constant of the arrangement.

Fig. 2 represents the wiring diagram for a heating plant for a reset of the kind discussed, in which, however, two heating coils 61 and 62 are provided in the reset organ. In contradistinction to Fig. 1, the two switches 12 and 13 of this example each control a motor coil 16, 17 of an adjustment drive. The control of the heating coils 61, 62 is brought about through a successive switch combination 11 including two commutating elements 12 and 13 which may be designed, for instance, as quick-break switch, the switching instants thereof being spaced apart by a definite amount of time. Electrically the commutating elements 12, 13 are wired such that a change-over switch with neutral middle position arises. Thermically it is to be noted that the letter k stands for cold and the letter w for warm. The switches close on k with falling temperature and close on w with rising temperature.

The indicated switch position corresponds with the neutral middle position taken at maintained desired temperature. The switching point of switch 12 lying in this condition somewhat below the desired temperature level, it closes on contact w. The switch 13, on the other hand, closes on contact k, since its switching point lies in the mentioned condition somewhat above the calculated temperature. Thus at the desired temperature the partial heating coil of the reset 61 is continually inserted, whereby the expansion body of the reset member undergoes a greater expansion for each unit of length owing to its higher temperature with respect to the expansion tube.

If the temperature now falls, the switch 12 is thrown over to k, what causes the partial heating coil 61 to be cut-out and, on the other hand, say a hot water valve of the plant being regulated to be opened by the action of the motor coil 16. The reset action, however, anticipates the resulting increase of the medium or feeler temperature of the instrument, since the switch 12 is again thrown to contact w before the desired temperature is attained or overshot. If after a certain definite period the temperature is not yet at the calculated value, then the hot water valve is actuated once more until the desired condition sets in.

If the temperature rises, the switch 13 changes over to contact w what causes the partial heating coil 62 to be wired up parallel with the partial heating coil 61 and, on the other hand, a hot water valve to be closed by the action of the motor coil 17. Due to the now reinforced heating the reset action anticipates the decrease of the medium or feeler temperature of the instrument thereby involved, as the switch 13 again changes over to contact w, thus establishing the desired condition in the same way as described heretofore.

Consequently the form of embodiment explained also works in the sense of a thermal reset, i. e. in this case the action is merely a temporary one, that is to say flexible. It is particularly adapted to exercise a stabilizing effect on a regulating process.

In Fig. 2 the numerals 14 and 15 designate two regulating rheostats intended for adjusting the action of the heating reset members 61 and 62; the main circuit system being in addition denoted by A, B.

Fig. 3 shows the diagram of connections for a form of embodiment in which the reset organ is no longer controlled by the switching member of the temperature regulator itself, but by a separate impulse transmitter 19. As a consequence of the periodic heating of the reset member thereby involved, the tubular body of the reset member 7 performs to-and-fro motions which are superimposed on the expansions of the temperature feeler. Therefore in the steady condition (inertia) at the desired temperature level, periodic oscillations are imparted to the switching member, which are likewise apt to lessen the insensitiveness of the temperature regulator to a low value. Temperature departures from the calculated value give rise, according to their magnitude, to control impulses of more or less length. The action of the regulator is therefore steady within a specified range around the calculated value, whereas beyond this range it becomes unsteady owing to the continual contacts which then ensue.

Although the reset organ may be disposed within the temperature feeler at any point, the arrangement according to the embodiment in Fig. 1, where the reset member is lodged in that portion of the temperature feeler adjacent to the head of the instrument, appears to be particularly advantageous, inasmuch as an easy interchangeability of the heating cartridge 6 is thereby ensured. Another favourable point is seen in the fact that the inactive part of the temperature feeler falls within the range of the fittings to be built-in therewith.

Having thus described my invention, what I claim as new is:

1. An immersion temperature regulator comprising, in combination a temperature feeler, a thermal reset member, and a switch adapted to energize alternately a load circuit and a circuit in said thermal reset member, said thermal reset member being between said switch and temperature feeler.

2. An immersion temperature regulator comprising, in combination, a temperature feeler, a thermal reset member having substantially the same coefficient of expansion as said temperature feeler, and a switch adapted to open and close alternately an external load circuit and a circuit in said thermal reset member, said thermal reset member being between said switch and temperature feeler.

3. An immersion temperature regulator comprising, in combination a temperature feeler, a thermal reset member containing separate heating coils, and a switch adapted to alternately close the circuits in said heating coils, said thermal reset member being between said switch and temperature feeler.

4. An immersion temperature member comprising in combination a temperature feeler, a thermal reset member, a switch adapted to alternately open and close an external load circuit and a circuit in said thermal reset member, said thermal reset member being positioned in that portion of the temperature feeler nearest the switch.

5. An immersion temperature regulator comprising, in combination, a thermally expansible hollow member to be immersed in a liquid to be heated, a second thermally expansible member within said hollow member, more slowly responsive to the temperature of said liquid, an electric heating element heating said second member more rapidly than the first member, a switch actuated by the difference in the thermal expansion of said members for alternately energizing said heating element or an electric heating element for said liquid whereby said second expansible member is heated when the liquid is sufficiently hot to have caused interruption of the energization of the heater for said liquid.

ALBERT KÄSER.

REFERENCES CITED

The following references are of record in the file of this patent:

UNITED STATES PATENTS

| Number | Name | Date |
|---|---|---|
| 1,594,022 | Smith | July 27, 1926 |
| 1,686,286 | McCabe | Oct. 2, 1928 |

FOREIGN PATENTS

| Number | Country | Date |
|---|---|---|
| 239,408 | Switzerland | Jan. 16, 1946 |